United States Patent [19]

Kawabe

[11] Patent Number: 5,015,724
[45] Date of Patent: May 14, 1991

[54] PROCESS OF PRODUCING POLYESTER, AND DEVELOPER COMPOSITION FOR ELECTROPHOTOGRAPHY

[75] Inventor: Kuniyasu Kawabe, Wakayama, Japan

[73] Assignee: KAO Corporation, Tokyo, Japan

[21] Appl. No.: 434,728

[22] Filed: Nov. 13, 1989

[30] Foreign Application Priority Data

Nov. 18, 1988 [JP] Japan .................................. 63-291951

[51] Int. Cl.$^5$ ............................................. C08G 63/02
[52] U.S. Cl. ..................................... 528/272; 528/296; 528/302; 528/303; 528/305; 528/306; 528/308; 528/308.6; 430/109
[58] Field of Search ............... 528/272, 296, 302, 303, 528/305, 306, 308, 308.6; 430/109

[56] References Cited

U.S. PATENT DOCUMENTS

| | | | |
|---|---|---|---|
| 4,533,614 | 8/1985 | Fukumoto et al. | 430/99 |
| 4,533,617 | 8/1985 | Inoue et al. | 430/111 |
| 4,804,622 | 2/1989 | Tanaka et al. | 430/109 |
| 4,849,495 | 7/1989 | Funato et al. | 528/194 |

*Primary Examiner*—John Kight, III
*Assistant Examiner*—Sam A. Acquah
*Attorney, Agent, or Firm*—Birch, Stewart, Kolasch & Birch

[57] ABSTRACT

A modified polyester is produced by co-condensation-polymerizing a starting linear polyester which may have a branched group, having a number-average molecular weight of 300 to 1,400 and containing from 10 to less than 25 mole percent, basd on the total constituent monomer units of the starting polyester, of a dihydric alcohol having the following formula: HO—(CH2-)n—OH, in which n is an integer of 2 to 6, with a tri- or more-valent monomer(s) selected from a tri- or higher valent carboxylic acid, a derivative thereof and a tri- or higher-valent alcohol. The modified polyester is useful as binder resin in an electrophotographic developer composition and toner.

12 Claims, No Drawings

PROCESS OF PRODUCING POLYESTER, AND DEVELOPER COMPOSITION FOR ELECTROPHOTOGRAPHY

The present invention relates to a process for producing a modified polyester and also to a developer composition for electrophotography.

PRIOR ART

Conventional electrophotography involves the steps of uniformly charging a photoconductive insulating layer, exposing the layer, thereby dissipating the charge on the exposed portion and forming an electrical latent image, applying a toner (colored fine powder with charge) to the latent image, thereby making the latent image visible (development step), transferring the visible image to transfer paper (transfer step), and permanently fixing the toner to the transfer paper by heating or pressing or any other adequate fixing method (fixing step), as disclosed in U.S. Pat. Nos. 2,297,691 and 2,357,809. The toner should have various functions to meet the requirements in not only the development step but also in the transfer step and the fixing step.

Toners are subject to shear, impact, and friction in the development unit during operation and deteriorate after thousands or tens of thousands of copies. The deterioration of toners may be prevented if toners are made with a high-molecular weight tough resin which withstands friction. Unfortunately, this resin usually has such a high softening point that it is not completely fixed by the oven fixing of the non-contact type or by the radiant fixing with infrared rays (which is poor in heat efficiency). Even in the case of heat roll fixing of the contact type, which is commonly used owing to its high heat efficiency, it is necessary to raise the temperature of the heat roll sufficiently high so that the resin fixes completely. The high heat roll temperature deteriorates the fixing unit, curls transfer paper, and increases the energy consumption. Moreover, the above-mentioned resin is so poor in crushability that it lowers the productivity of toners. For the reasons mentioned above, it is impossible to use a binder resin which has an excessively high degree of polymerization and an excessively high softening point.

On the other hand, the heat roll fixing system is commonly used for low-speed fixing to high-speed fixing because of its very good heat which is attributable to pressure contact between the surface of the heating roll and the surface of the toner image to be fixed on the transfer paper. Nevertheless, it has a disadvantage in when the surface of the heating roll comes into contact with the surface of the toner image, the toner sticks to the surface of the heating roll and transfers to the succeeding transfer paper, resulting in so-called offset. To prevent this problem, the surface of the heating roll is coated with fluoroplastics having good release characteristics, and the coating surface is further improved by the application of a release agent such as silicone oil. However, this system makes the fixing unit not only bulky and expensive but also so complex so as to cause frequent failure.

Toner offset can be eliminated when the resin is rendered unsymmetrical or crosslinked, as disclosed in Japanese Patent Publication No. 493/1982 and Japanese Patent Laid-open Nos. 44836/1975 and 37353/1982. Nevertheless, the resin is not improved in fixing temperature.

Usually, the minimum fixing temperature is between the lower offset temperature and the higher offset temperature; therefore, the usable temperature range is between the minimum fixing temperature and the higher offset temperature. If the minimum fixing temperature is lowered as far as possible and the higher offset temperature is raised as far as possible, then it is possible to lower the fixing temperature and expand the usable temperature range. This leads to energy savings, rapid fixing, and curl prevention. For this reason, there has been a demand for a toner having good fixing performance and good offset resistance.

To meet this requirement, there was proposed a styrene-based binder resin incorporated with paraffin wax or low-molecular weight polyolefin as an anti-offset agent, as disclosed in Japanese Patent Laid-open Nos. 65232/1974, 28840/1975, and 81342/1975. The anti-offset agent does not produce the desired effect when used in a small amount; and it deteriorates the developer when used in an excessive amount.

Polyester resins are intrinsically superior in fixing performance and can be completely fixed even by the non-contact fixing system, as described in U.S. Pat. No. 3,590,000. However, they are not suitable for the heat roll fixing system because they are liable to cause offset. The anti-offset performance of polyester resins can be improved to some extent by incorporating them with a polybasic carboxylic acid, as described in Japanese Patent Laid-open Nos. 44836/1975, 37353/1982, and 109875/1982. The improvement, however, is not satisfactory or is achieved only at the expense of the low-temperature fixing performance inherent in polyester resins and also at the expense of crushability in the toner-making process.

There is a tendency in electrophotography for toners to become smaller in particle size for higher resolution. Therefore, how to produce a fine toner efficiently and economically has been a matter of concern.

The present invention was completed to meet the above-mentioned requirements. Accordingly, it is an object of the present invention to provide a process for producing a modified polyester having good crushability and also to provide a modified polyester-based toner.

It is another object of the present invention to provide a process for producing a binder resin for the developer which, in the heat roll fixing system, fixes at a lower fixing temperature and does not cause offset even when an anti-offset agent is not applied to the roll. It is further another object of the present invention to provide a developer composition made with said binder resin.

To achieve the above-mentioned objects, the present inventors carried out an extensive study, which led to the present invention.

The invention provides a process for preparing a modified polyester, which comprises co-condensation-polymerizing a starting linear polyester which may have a branched group, having a number-average molecular weight of 300 to 1,400 and containing 10 to less than 25 mole percent, based on the total constituent monomer units of the starting polyester, of a dihydric alcohol having the following formula: $HO-(CH_2)_n-OH$, in which n is an integer of 2 to 6, with a tri- or higher-valent monomer selected from a tri- or higher valent carboxylic acid, a derivative thereof and a tri- or higher-valent alcohol.

The called dihydric alcohol is called a divalent or bivalent alcohol.

The modified polyester is useful as a binder resin in electrophotographic developer composition and toner.

It is preferable that the tri- or higher valent monomer is used in an amount of 2.5 to less than 15 mole percent, based on the total monomer units contained in the modified polyester.

It is also preferable that the starting polyester contains 1 to 25 mole percent, based on the total monomer units of the modified polyester, of a dicarboxylic acid, or an anhydride thereof, having the following formula.

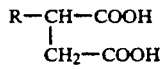

wherein R is a saturated hydrocarbon group having 4 to 20 carbon atoms, so that the modified polyester prepared may have branched groups.

The invention further provides a modified polyester as obtained by the process as defined above and then a developer composition for electrophotography which comprises the modified polyester as obtained by the process of the invention and a coloring matter.

The modified polyester of the invention is preferred to have a softening point of 106 to 160 degree C and a glass transition temperature or point of 50 to 80 degree C.

The invention includes an embodiment of a process for producing a modified polyester by the co-condensation polymerization of a linear polyester having a number-average molecular weight of 300 to 1400 with a trivalent or higher valent carboxylic acid and/or a trivalent or higher valent alcohol, wherein said process comprises using a diol component represented by the formula $HO(CH_2)_nOH$ (where n is an integer of 2 to 6.) as the bivalent alcohol in an amount of 10 mol % to 25 mol % of all the constituent monomer units in forming the linear polyester. The gist of the present invention also resides in a developer composition for electrophotography in which said modified polyester resin is the major constituent of the binder resin contained in the developer composition.

According to the present invention, an improved modified polyester is obtained when it is so modified that the trivalent or higher valent monomer components account for 2.5 mol % to 15 mol % of all the constituent monomer units.

According to the present invention, the polyester modified resin has improved characteristic properties when it has a softening point of 106° C. to 160° C. and a glass transition point of 50° C. to 80° C.

The invention will be explained in greater detail hereinbelow.

The modified polyester resin of the present invention is comprised of trivalent or higher valent monomers and a linear polyester previously polymerized from bivalent monomers. The linear polyester should preferably have a number-average molecular weight of 300 to 1400 so that it has improved crushability. If the linear polyester has a number-average molecular weight of less than 300, then it would be necessary that the amount of trivalent or higher valent monomers be more than 15 mol % of all of the constituent monomer units. This is not desirable for reasons mentioned later. If the starting linear polyester has a number-average molecular weight that is higher than 1400, then modified polyester resin formed by polymerizing the starting linear polyester with the trivalent or higher valent monomers has poor crushability.

The number-average molecular weight of the starting polyester produced from a bivalent carboxylic acid or acid anhydride and a bivalent alcohol may be calculated as follows from the number of terminal groups.

Number-average molecular weight =

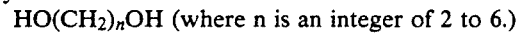

For polyesters produced by the ester interchange reaction, the number-average molecular weight can be obtained by the known GPC method (in terms of polystyrene) under the following conditions:

| | |
|---|---|
| Detector: | SYODEX RI SE-51 |
| Column: | A-80M |
| Solvent: | THF |
| Sample: | 0.5% THF solution |
| Sample amount: | 0.1 ml |
| Flow rate: | 1.0 ml/min |
| Effluent temperature: | 40° C. |
| Effluent pressure: | 40 kg/cm² |

The modified polyester of the present invention is composed of a polyester (which has previously been polymerized from monomers excluding trivalent or higher valent monomers) and trivalent or higher valent monomers, and the polyester is required to have a number-average molecular weight of 300 to 1400. This requirement can be met when the amount (mol%) of the trivalent or higher valent monomers is increased or when the bivalent monomers are incorporated with low-molecular weight compounds.

According to the present invention, the polyester resin can be obtained by the condensation polymerization of an alcohol with a carboxylic acid or a derivative thereof such as a carboxylic ester and a carboxylic anhydride. The alcohol component is a diol represented by the formula:

$HO(CH_2)_nOH$ (where n is an integer of 2 to 6.)

Examples of the diol include ethylene glycol, 1,3-propylene glycol, 1,4-butanediol, 1,5-pentanediol, and 1,6-hexanediol. Preferable among these diols are ethylene glycol, 1,3-propylene glycol, and 1,4-butanediol. This diol component should be used in an amount of 10 mol % to 25 mol % in all the constituent monomer units. With an amount less than 10 mol %, the resulting toner has a minimum fixing temperature which is higher than normal. With an amount more than 25 mol %, the resulting polyester resin is crystalline, which is undesirable as mentioned in Japanese Patent Publication No. 493/1982.

The feature of the present invention will be more salient in the case where the acid component constituting the linear polyester having side chains is represented by the formula:

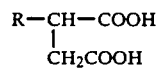

where R denotes a saturated or unsaturated hydrocarbon group having 4 to 20 carbon atoms.

Additional examples include other dibasic carboxylic acids, anhydrides thereof, and lower alkyl esters thereof. The dibasic carboxylic acid to be used in combination with or in place of the dibasic fatty acid will produce the effect of lowering the minimum fixing temperature without lowering the offset temperature. The dibasic carboxylic acid is an acid represented by the formula:

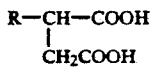

or an anhydride thereof or lower alkyl ester thereof. It includes, for example, n-butylsuccinic acid, n-butenylsuccinic acid, isobutylsuccinic acid, isobutenylsuccinic acid, n-octylsuccinic acid, n-octenylsuccinic acid, isooctylsuccinic acid, isooctenylsuccinic acid, n-dodecylsuccinic acid, n-dodecenylsuccinic acid, isododecylsuccinic acid, and isododecenylsuccinic acid.

The bivalent alcohol component also includes diols other than those mention, etherified bisphenols, bisphenol A, hydrogenated bisphenol A, and other bivalent alcohols. Examples of the diols include diethylene glycol, triethylene glycol, 1,2-propylene glycol, neopentyl glycol, 1,4-butenediol, and 1,4-cyclohexane dimethanol. Examples of the etherified bisphenol A include polyoxypropylene (2.2)-2,2-bis(4-hydroxyphenyl)-propane, polyoxypropylene (3.3)-2,2-bis(4-hydroxyphenyl)-propane, polyoxyethylene (2.0)-2,2-bis(4-hydroxyphenyl)-propane, and polyoxypropylene (6)-2,2-bis(4-hydroxyphenyl)propane.

The trivalent or higher valent alcohol used in the present invention includes, for example, sorbitol, 1,2,3,6-hexanetetrol, 1,4-sorbitan, pentaerythritol, 1,2,4-butanetriol, 1,2,5-pentanetriol, glycerol, diglycerol, 2-methyl-1,2,4-butanetriol, trimethylolethane, trimethylolpropane, and 1,3,5-trihydroxybenzene.

The carboxylic acid component used in the present invention includes bivalent carboxylic acids and trivalent and higher valent carboxylic acids. Examples of the bivalent carboxylic acid include maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azelaic acid, malonic acid, alkenyl or alkyl succinic acid (such as n-dodecenyl succinic acid, isododecenyl succinic acid, n-dodecyl succinic acid, and isododecyl succinic acid), anhydrides thereof, and lower alkyl esters thereof. Examples of the trivalent and higher valent carboxylic acid include 1,2,4-benzenetricarboxylic acid (trimellitic acid), 2,5,7-naphthalenetricarboxylic acid, 1,2,4-butanetricarboxylic acid, 1,2,5-hexanetricarboxylic acid, 1,3-dicarboxy-2-methyl-2-methylenecarboxypropane, tetra(methylenecarboxy)methane, 1,2,7,8-octanetetracarboxylic acid, Empol trimer acid, anhydrides thereof, and lower alkyl esters thereof. Preferred bivalent carboxylic acids are terephthalic acid and lower alkyl esters thereof.

According to the present invention, the trivalent or higher valent monomers prevent the toner containing them from causing offset. With a small amount, they do not produce the desired effect but they aggravate the crushability of the resulting polyester resin and toner. With an excessively large amount, they do not provide a polyester of stable performance because they make reactions difficult to control, and they also provide a toner which has a minimum fixing temperature which is higher than usual. The trivalent or higher valent monomers should be used in an amount of 2.5 mol % to 15 mol % in all the constituent monomer units.

The modified polyester resin of the present invention should preferably have a softening point of 106° C. to 160° C. and glass transition point of 50° C. to 80° C. With a softening point lower than 106° C., the modified polyester resin does not have a sufficient temperature range in which offset does not take place. With a softening point higher than 160° C., the modified polyester resin has a minimum fixing temperature higher than normal. With a glass transition point lower than 50° C., the polyester resin yields a toner which is poor in storage stability. With a glass transition point higher than 80° C., the polyester resin is poor in fixing performance.

The modified polyester resin of the present invention can be produced by the condensation polymerization of polyvalent carboxylic acid components and polyol components at 180°-250° C. in an inert atmosphere. The reaction may be accelerated by the aid of a commonly used esterification catalyst such as zinc oxide, stannous oxide, dibutyltin oxide, and dibutyltin dilaurate. Also, the reaction may be carried out under reduced pressure.

The modified polyester resin of the present invention is used as the binder resin of toners. To make toners, it is incorporated with a colorant, and, if necessary, a charge control agent and magnetic material.

Examples of the colorant include a variety of carbon blacks (produced by thermal black process, acetylene black process, channel black process, lamp black process, etc.), phthalocyanine blue, permanent brown FG, brilliant fast scarlet, pigment green B, rhodamine B base, solvent red 49, solvent red 146, and solvent blue 35, and mixtures thereof. Usually, the colorant is used in an amount of 1 to 15 parts by weight for 100 parts by weight of the binder resin.

The charge control agent that is used according to need in the present invention may be either of the positive type or the negative type. Examples of positive charge control agent include nigrosine dyes (such as "Nigrosine base EX", "Oil Black BS", "Oil Black SO", "Bontron N-01", and "Bontron N-11" made by Orient Chemical Co., Ltd.), triphenylmethane dyes having a tertiary amine as a side chain, quaternary ammonium salt compounds (such as "Bontron P-51" made by Orient Chemical Co., Ltd.), cetyltrimethylammonium bromide, and polyamine resins (such as "AFP-B" made by Orient Chemical Co., Ltd.). Examples of negative charge control agent include metal-containing azo dyes (such as "Varifast Black 3804", "Bontron S-31", "Bontron S-32", "Bontron S-34", "Bontron S-36" (made by Orient Chemical Co., Ltd.), and "Eisen Spiron Black TVH" (made by Hodogaya Chemical Co., Ltd.), copper phthalocyanine dyes, and metal complex of alkyl derivative of salicylic acid (such as "Bontron E-82", "Bontron E-84", and "Bontron E-85" made by Orient Chemical Co., Ltd.).

The charge control agent should be used in an amount of 0.1 to 8.0 wt %, preferably 0.2 to 5.0 wt %, of the binder resin.

A toner is usually incorporated with polyolefin wax (as an anti-offset agent), hydrophobic silica (as a fluidity improver), and other improvers. In the case where the modified polyester resin of the present invention is used as a binder resin, such improvers are not necessary at all or are used only in a small quantity.

The modified polyester resin of the present invention is uniformly mixed with colorants and optional improvers, and the mixture is made into a toner having an average particle diameter of 5-15 microns by melt-kneading, cooling, crushing pulverizing and classifying usually The toner is then mixed with a magnetic powder, which is a resincoated iron oxide carrier, pearly iron oxide carrier, or ferrite carrier. The resulting mixture is a dry two-component developer composition.

The binder resin of the present invention is made into a magnetic toner when it is incorporated with a magnetic material. Examples of the magnetic material include ferromagnetic metals (such as iron, cobalt, and nickel) and compounds and alloys (such as ferrite, hematite, and magnetite) containing a ferromagnetic element. The magnetic material is used in the form of a fine powder having an average particle diameter of 0.1 to 1 μm. It is used in an amount of 30 to 70 parts by weight for 100 parts by weight of the binder resin.

EXAMPLES

The invention will be explained in more detail with reference to the following examples for the production of the modified polyesters and developer compositions for electrophotography. The examples are not intended to restrict the scope of the invention. In the examples, "parts" means "parts by weight".

EXAMPLE 1

In a 2-liter four-neck glass flask equipped with a thermometer, stainless steel stirrer, glass nitrogen inlet, and reflux condenser were placed 89.3 g of ethylene glycol, 75.5 g of 1,2-propylene glycol, 62.4 g of neopentyl glycol, 368.5 g of terephthalic acid, and 1.5 g of dibutyltin dilaurate. With the flask heated in a mantle heater, the reactants underwent reaction at 170° C. for 5 hours with stirring under normal pressure in a nitrogen atmosphere. The reaction was continued at 210° C. until the softening point of the reaction product (measured according to ASTM E28-51T) was constant. (At this stage of reaction, the reaction product had an acid value of 0.5 KOH mg/g and a hydroxyl value of 143.3 KOH mg/g, and also had a number-average molecular weight of 780 calculated from these values.) To the flask was added 138.2 g of 1,2,4-benzenetricarboxylic acid anhydride, and the reaction was continued at 210° C. until the reaction product had a prescribed softening point (measured according to ASTM E28-51T). The reaction was suspended and the reaction product was cooled to room temperature. Thus there was obtained a light yellow solid modified polyester resin, which had a glass transition point of 64° C. measured with a differential calorimeter. This modified polyester resin is designated as polyester (1).

EXAMPLES 2 TO 5, COMPARATIVE EXAMPLES 1 TO 4, AND Referential Examples 1 and 2

The same procedure as in Example 1 was repeated, except that the type and amount of the monomers were changed as shown in Table 1. Thus there were obtained modified polyester resins designed as polyesters (2) to (5), comparative polyesters (1) to (4), and referential polyesters (1) and (2). The physical properties of these polyesters are also shown in Table 1.

TABLE 1

Polyesters and Constituent Monomers thereof

| | Constituent Monomers (mol %) | | | | | | |
|---|---|---|---|---|---|---|---|
| | Polyoxy-propylene-(2.2)-2,2-bis-(4-hydroxyphenyl)propane | Ethylene glycol | 1,4-butanediol | 1,2-propylene glycol | Diethylene glycol | Neopentyl glycol | Trimethylol propane |
| Polyester (1) | — | 24 | — | 18 | — | 9 | — |
| Polyester (2) | 4 | 20 | 3 | 18 | — | 6 | — |
| Polyester (3) | — | 24 | — | 18 | — | 9 | — |
| Polyester (4) | 4 | 11 | 2 | 18 | — | 6 | 8 |
| Polyester (5) | — | 20 | — | 8 | 4 | 19 | — |
| Comparative Polyester (1) | — | 24 | — | 18 | — | 9 | — |
| Comparative Polyester (2) | — | 24 | — | 18 | — | 9 | — |
| Comparative Polyester (3) | 45 | 6 | — | — | — | — | — |
| Comparative Polyester (4) | — | 6 | — | 45 | — | — | — |
| Referential Example (1) | — | 24 | — | 18 | — | 9 | — |
| Referential Example (2) | — | 24 | — | 18 | — | 9 | — |

| | Constituent Monomers (mol %) | | | | Resin Properties | | |
|---|---|---|---|---|---|---|---|
| | Terephthalic acid | Dimethyl terephthalate | Dodecenyl succinic anhydride | Trimellitic anhydride | Ring & ball softening point (°C.) | Glass transition point (°C.) | Number-average molecular weight of linear polyester |
| Polyester (1) | 37 | — | — | 12 | 130 | 64 | 780 |
| Polyester (2) | — | 37 | — | 12 | 130 | 64 | 460 |
| Polyester (3) | 32 | — | 5 | 12 | 130 | 62 | 510 |
| Polyester (4) | — | 51 | — | — | 130 | 63 | 920 |
| Polyester (5) | 44 | — | — | 5 | 130 | 62 | 1240 |
| Comparative Polyester (1) | 47 | — | — | 2 | 130 | 68 | 2100 |
| Comparative Polyester (2) | 39 | — | — | 18 | 130 | 60 | 280 |
| Comparative Polyester (3) | 37 | — | — | 12 | 130 | 75 | 1500 |
| Comparative Polyester (4) | 37 | — | — | 12 | 130 | 68 | 450 |
| Referential Example (1) | 37 | — | — | 12 | 103 | 52 | 390 |
| Referential Example (2) | 37 | — | — | 12 | 165 | 68 | 390 |

EXAMPLES 6 TO 10, COMPARATIVE EXAMPLES 5 TO 8, AND Referential Examples 3 and 4

The materials specified below were preliminarily mixed by a Henschel mixer. The mixture was made into a toner having an average particle diameter of 11 μm by melt-kneading in a twin-screw extruder, cooling, crushing, pulverizing and classifying usually.

| | | |
|---|---|---|
| Example 6 | Polyester (1) | 90 parts |
| | Carbon Black #44 (made by Mitsubishi Kasei) | 7 parts |
| | Negative charge control agent "Eisen Spiron Black TVH" (made by Hodogaya Kagaku) | 2 parts |
| Example 7 | Polyester (2) | 90 parts |
| | Carbon Black #44 | 7 parts |
| | Negative charge control agent "Bontron S-34" (made by Orient Chemical) | 2 parts |
| Example 8 | Polyester (3) | 90 parts |
| | Carbon Black #44 | 7 parts |
| | Negative charge control agent "Eisen Spiron Black TVH" | 2 parts |
| | Polypropylene Wax "Viskol 550P" (made by Sanyo Kasei) | 1 part |
| Example 9 | Polyester (4) | 90 parts |
| | Carbon Black #44 | 7 parts |
| | Positive charge control agent "Bontron N-01" (made by Orient Chemical) | 2 parts |
| Example 10 | Polyester (5) | 98 parts |
| | Copper phthalocyanine | 2 parts |
| Comparative Example 5 | Comparative polyester (1) | 90 parts |
| | Carbon Black #44 | 7 parts |
| | Negative charge control agent "Eisen Spiron Black TVH" | 2 parts |
| Comparative Example 6 | Comparative polyester (2) | 90 parts |
| | Carbon Black #44 | 7 parts |
| | Negative charge control agent "Eisen Spiron Black TVH" | 2 parts |
| Comparative Example 7 | Comparative polyester (3) | 90 parts |
| | Carbon Black #44 | 7 parts |
| | Negative charge control agent "Eisen Spiron Black TVH" | 2 parts |
| Comparative Example 8 | Comparative polyester (4) | 90 parts |
| | Carbon Black #44 | 7 parts |
| | Negative charge control agent "Bontron S-34" | 2 parts |
| Referential Example 3 | Referential polyester (1) | 90 parts |
| | Carbon Black #44 | 7 parts |
| | Negative charge control agent "Bontron S-34" | 2 parts |
| Referential Example 4 | Referential polyester (2) | 90 parts |
| | Carbon Black #44 | 7 parts |
| | Negative charge control agent "Bontron S-34" | 2 parts |

The toners obtained in Examples 6 to 10 are designated as toners 1 to 5; the toners obtained in Comparative Examples 5 to 8 are designated as comparative toners 1 to 4; and the toners obtained in Referential Examples 3 and 4 are designated as referential toners 1 and 2.

Each toner (39 parts) was mixed with 1261 parts of resin-coated iron powder to give a developer composition. The developer composition was evaluated by using it for a commercial electrophotographic duplicator. (The photoelectric material was amorphous selenium, except in the case of toner 4 for which an organic photoconductive material was used. The fixing roll was run at a rate of 255 mm/min. The heat roll temperature was variable. The fixing unit was run, with the oil applicator removed.)

Each toner was examined for fixing performance and offset, with the fixing temperature set at 120° C. to 220° C. The results are shown in Table 2.

The minimum fixing temperature is the temperature of the fixing roll at which the fixing ratio (defined below) is higher than 70%.

$$\text{Fixing ratio} = \frac{\text{Image density measured after rubbing}}{\text{Image density measured before rubbing}}$$

The image density is an optical reflection density measured with a reflection densitometer made by Macbeth Co., Ltd. The image density was measured before and after the fixed image had been rubbed by moving back and forth five times a sand eraser (having a bottom area of 15 mm by 7.5 mm) under a load of 500 g.

The resin was tested for crushability in the following manner. The crushed resin is sieved to obtain a fraction which passes through a 16 mesh screen but does not pass through a 20-mesh screen Accurately weighed 30.00 g of the classified resin powder is crushed for 15 seconds in a coffee mill (Model HR-2170 made by Philips Co., Ltd.). That fraction of the powder which does not pass through a 32-mesh screen is weighed out accurately (X g). The residue ratio (%) is calculated from the following equation.

$$\text{Residue ratio (\%)} = \frac{X(g)}{\text{Weight (30.00 g) of resin before crushing}}$$

The above-mentioned procedure is repeated three times and an average value is obtained The crushability of the resin is given rankings of A, B, C, and D according to the residue ratios 0–15.0%, 15.1–30.0%, 30.1–45.0%, and 45.1–100%, respectively.

TABLE 2

| | Image density | Minimum fixing temperature (°C.) | Temperature below which offset occurs (°C.) | Temperature above which offset occurs (°C.) | Crushability of resin |
|---|---|---|---|---|---|
| Toner 1 | 1.38 | 132 | 130 | 220< | A |
| Toner 2 | 1.37 | 132 | 130 | 220< | A |
| Toner 3 | 1.37 | 131 | 130 | 220< | A |
| Toner 4 | 1.36 | 132 | 130 | 220< | A |
| Toner 5 | 1.40 | 131 | 130 | 220< | A |
| Comparative toner 1 | 1.35 | 145 | 140 | 200 | D |
| Comparative toner 2 | 1.36 | 162 | 135 | 220< | A |
| Comparative toner 3 | 1.36 | 170 | 135 | 220< | C |
| Comparative toner 4 | 1.36 | 170 | 140 | 200 | A |
| Referential toner 1 | 1.38 | 125 | * | * | A |

TABLE 2-continued

|  | Image density | Minimum fixing temperature (°C.) | Temperature below which offset occurs (°C.) | Temperature above which offset occurs (°C.) | Crushability of resin |
| --- | --- | --- | --- | --- | --- |
| Referential toner 2 | 1.37 | 170 | 130 | 220< | B |

*There is no temperature range in which offset does not occur.

It is noted from Table 2 that toners 1 to 5 pertaining to the present invention have low minimum fixing temperatures and broad non-offset ranges and can be made with good crushability. By contrast, comparative toner 1 has a rather narrow non-offset range; comparative toner 3 has a high minimum fixing temperature; and comparative toners 1 and 3 are poor in crushability (because their source resins are poor in crushability). Comparative toner 2 has a high minimum fixing temperature and its source resin is poor in production stability although it has good crushability. Comparative toner 4 and referential toner 2 have high minimum fixing temperatures, and referential toner 1 has a non-offset range which is far away from the practical level.

EXAMPLE 11

In a 2-liter four-neck glass flask equipped with a thermometer, stainless steel stirrer, glass nitrogen inlet, and reflux condenser were placed 74.4 g of ethylene glycol, 187.2 g of neopentyl glycol, 81.9 g of isooctenylsuccinic anhydride, 259.0 g of terephthalic acid, and 1.5 g of dibutyltin dilaurate. With the flask heated in a mantle heater, the reactants underwent reaction at 170° C. for 5 hours with stirring under normal pressure in a nitrogen atmosphere. The reaction was continued at 210° C. until the softening point of the reaction product (measured according to ASTM E28-51T) was constant (At this stage of reaction, the reaction product had an acid value of 0.9 KOH mg/g and a number-average molecular weight of 820 measured by GPC.) To the flask was added 161.3 g of 1,2,4-benzenetricarboxylic acid anhydride, and the reaction was continued at 210° C. until the reaction product had a prescribed softening point (measured according to ASTM E28-51T). The reaction was suspended and the reaction product was cooled to room temperature. Thus there was obtained a light yellow solid modified polyester resin, which had a glass transition point of 62° C. measured with a differential calorimeter. This modified polyester resin is designated as polyester (6).

EXAMPLES 12 TO 15, COMPARATIVE EXAMPLES 9 AND 10, AND Referential Examples 5 and 6

The same procedure as in Example 11 was repeated, except that the kind and amount of the monomers were changed as shown in Table 3. Thus there were obtained modified polyesters designed as polyesters (7) to (10), comparative polyesters (5) and (6), and referential polyesters (3) and (4). The physical properties of these polyesters are also shown in Table 3.

EXAMPLES 16 TO 20, COMPARATIVE EXAMPLES 11 AND 12, AND Referential Examples 7 and 8

The materials specified below were preliminarily mixed by a Henschel mixer. The mixture was made into a toner having an average particle diameter of 9 μm by melt-kneading in a twin-screw extruder, cooling, crushing pulverizing and classifying usually.

| Example 16 | Polyester (6) | 90 parts |
| --- | --- | --- |
|  | Carbon Black #44 (made by Mitsubishi Kasei) | 7 parts |
|  | Negative charge control agent "Eisen Spiron Black TVH" (made by Hodogaya Kagaku) | 2 parts |
| Example 17 | Polyester (7) | 90 parts |
|  | Carbon Black #44 | 7 parts |
|  | Negative charge control agent "Bontron S-34" (made by Orient Chemical) | 2 parts |
| Example 18 | Polyester (8) | 90 parts |
|  | Carbon Black #44 | 7 parts |
|  | Negative charge control agent "Eisen Spiron Black TVH" | 2 parts |
|  | Polypropylene wax "Viskol 550P" (made by Sanyo Kasei) | 1 part |
| Example 19 | Polyester (9) | 90 parts |
|  | Carbon Black #44 | 7 parts |
|  | Positive charge control agent "Bontron N-01" (made by Orient Chemical) | 2 parts |
| Example 20 | Polyester (10) | 98 parts |
|  | Copper phthalocyanine | 2 parts |
| Comparative Example 11 | Comparative polyester (5) | 90 parts |
|  | Carbon Black #44 | 7 parts |
|  | Negative charge control agent "Eisen Spiron Black TVH" | 2 parts |
| Comparative Example 12 | Comparative polyester (6) | 90 parts |
|  | Carbon Black #44 | 7 parts |
|  | Negative charge control agent "Eisen Spiron Black TVH" | 2 parts |
| Referential Example 7 | Referential polyester (3) | 90 parts |
|  | Carbon Black #44 | 7 parts |
|  | Negative charge control agent "Bontron S-34" | 2 parts |
| Referential Example 8 | Referential polyester (4) | 90 parts |
|  | Carbon Black #44 | 7 parts |
|  | Negative charge control agent "Bontron S-34" | 2 parts |

The toners obtained in Examples 16 to 20 are designated as toners 6 to 10; the toners obtained in Comparative Examples 11 and 12 are designated as comparative toners 5 and 6; and the toners obtained in Referential Examples 7 and 8 are designated as referential toners 3 and 4.

Each toner (52 parts) was mixed with 1248 parts of resin-coated Cu-Zn ferrite powder having an average particle size of 90 microns to give a developer composition. The developer composition was evaluated by using it for a commercial electrophotographic duplicator. (The photoelectric material was amorphous selenium, except in the case of toner 9 for which an organic photoconductive material was used. The fixing roll was run at a rate of 255 mm/min. The heat roll temperature was variable The fixing unit was run, with the oil applicator removed.)

Each toner was examined for fixing performance and offset, with the fixing temperature set at 120° C. to 220° C. The results are shown in Table 4.

The minimum fixing temperature is the temperature of the fixing roll at which the fixing ratio (defined below) is higher than 70%.

$$\text{Fixing ratio} = \frac{\text{Image density measured after rubbing}}{\text{Image density measured before rubbing}}$$

The image density is an optical reflection density measured with a reflection densitometer made by Macbeth Co., Ltd. The image density was measured before and after the fixed image had been rubbed by moving back and forth five times a sand eraser (having a bottom area of 15 mm by 7.5 mm) under a load of 500 g.

The resin was tested for crushability in the following manner. The crushed resin is sieved to obtain a fraction which passes through a 16-mesh screen but does not pass through a 20-mesh screen. Accurately weighed 30.00 g of the classified resin powder is crushed for 15 seconds in a coffee mill (Model HR-2170 made by Philips Co., Ltd.). That fraction of the powder which does not pass through a 32-mesh screen is weighed out accurately (X g). The residue ratio (%) is calculated from the following equation.

$$\text{Residue ratio (\%)} = \frac{X(g)}{\text{Weight (30.00 g) of resin before crushing}}$$

The above-mentioned procedure is repeated three times and an average value is obtained. The crushability of the resin is given rankings of A, B, C, and D according to the residue ratios 0–15.0%, 15.1–30.0%, 30.1–45.0%, and 45.1–100%, respectively.

It is noted from Table 4 that toners 6 to 10 pertaining to the present invention have low minimum fixing temperatures and broad non-offset ranges and can be made with good crushability. By contrast, comparative toner 5 has a rather narrow non-offset range and is poor in crushability. Because their source resin is poor in crushability. Comparative toner 6 has a high minimun fixing temperature and its source resin is poor in production stability although it has good crushability. Referential toner 4 has high minimum fixing temperatures, and referential toner 3 has a non-offset range which is far away from the practical level.

TABLE 3

Polyesters and Constituent Monomers thereof

| | Constituent Monomers (mol %) | | | | | | | |
|---|---|---|---|---|---|---|---|---|
| | Polyoxy-propylene-(2.2)-2,2-bis-(4-hydroxyphenyl) propane | Ethylene glycol | 1,4-butanediol | 1,2-propylene glycol | Diethylene glycol | Neopentyl glycol | Trimethylol propane | Terephthalic acid | Dimethyl terephthalate |
| Polyester (6) | — | 20 | — | — | — | 30 | — | 28 | — |
| Polyester (7) | 4 | 20 | 3 | 8 | — | 15 | — | — | 30 |
| Polyester (8) | — | 24 | — | 8 | — | 18 | — | 23 | — |
| Polyester (9) | 4 | 11 | 2 | 8 | — | 17 | 8 | — | 40 |
| Polyester (10) | — | 16 | — | 11 | 4 | 19 | — | 35 | — |
| Comparative Polyester (5) | — | 20 | — | — | — | 30 | — | 41 | — |
| Comparative Polyester (6) | — | 20 | — | — | — | 30 | — | 23 | — |
| Referential Example (3) | — | 24 | — | 8 | — | 18 | — | 23 | — |
| Referential Example (4) | — | 24 | — | 8 | — | 18 | — | 23 | — |

| | Constituent Monomers (mol %) | | | | | Resin Properties | | |
|---|---|---|---|---|---|---|---|---|
| | Isooctenyl succinic anhydride | n-octtenyl succinic anhydride | Isododecenyl succinic anhydride | Dodecenyl succinic anhydride | Trimellitic anhydride | Ring & ball softening point (°C.) | Glass transition point (°C.) | Number-average molecular weight of linear polyester |
| Polyester (6) | 7 | — | — | — | 15 | 130 | 62 | 820 |
| Polyester (7) | — | 8 | — | — | 12 | 130 | 62 | 640 |
| Polyester (8) | — | — | 12 | — | 15 | 130 | 61 | 920 |
| Polyester (9) | — | — | — | 10 | — | 130 | 63 | 1040 |
| Polyester (10) | 10 | — | — | — | 5 | 130 | 64 | 1150 |
| Comparative Polyester (5) | 7 | — | — | — | 2 | 130 | 68 | 2300 |
| Comparative Polyester (6) | 7 | — | — | — | 20 | 130 | 61 | 290 |
| Referential Example (3) | — | — | 12 | — | 15 | 103 | 52 | 920 |
| Referential Example (4) | — | — | 12 | — | 15 | 165 | 68 | 920 |

TABLE 4

| | Image density (black solid) | Minimum fixing temperature (°C.) | Temperature below which offset occurs (°C.) | Temperature above which offset occurs (°C.) | Crushability of resin |
|---|---|---|---|---|---|
| Toner 6 | 1.37 | 129 | 125 | 220< | A |
| Toner 7 | 1.37 | 129 | 125 | 220< | A |
| Toner 8 | 1.37 | 130 | 125 | 220< | A |
| Toner 9 | 1.38 | 129 | 125 | 220< | A |
| Toner 10 | 1.35 | 129 | 125 | 220< | A |
| Comparative toner 5 | 1.36 | 145 | 140 | 200 | D |
| Comparative toner 6 | 1.37 | 162 | 135 | 220< | A |
| Referential toner 3 | 1.37 | 120 | * | * | A |

TABLE 4-continued

| | Image density (black solid) | Minimum fixing temperature (°C.) | Temperature below which offset occurs (°C.) | Temperature above which offset occurs (°C.) | Crushability of resin |
|---|---|---|---|---|---|
| Referential toner 4 | 1.37 | 165 | 130 | 220)< | B |

*There is no temperature range in which offset does not occur.

What is claimed is:

1. A co-condensation-polymerization process for preparing a modified polyester which comprises the steps of:
   (1) reacting 10 to less than 25 mole percent of a dihydric alcohol having the following formula:

HO—(CH$_2$)$_n$—OH in which n is an integer of 2 to 6, with
   1 to 25 mole percent of a dicarboxylic acid or anhydride thereof having the following formula:

R—CH—COOH
   |
   CH$_2$—COOH in which R is a saturated or unsaturated hydrocarbon group having 4 to 20 carbon atoms,
   to produce a starting linear polyester having a number-average molecular weigh of 300 to 1,400,
   wherein the mole percent of the dihydric alcohol is based on the total constituent monomer units of said starting linear polyester and the mole percent of the dicarboxylic acid or the anhydride thereof is based on the total monomer units of the modified polyester prepared, and
   (2) reacting the produced starting linear polyester of step (1) with a tri- or higher-valent monomer selected from a tri- or higher-valent carboxylic acid, a derivative thereof, or a tri- or higher-valent alcohol,
   to produce the modified polyester.

2. The process as claimed in claim 1, wherein said tri- or higher-valent monomer is used in an amount of 2.5 to less than 15 mole percent, based on the total monomer units contained in the modified polyester.

3. The modified polyester produced by the process as defined in any one of claims 2 and 1.

4. The modified polyester as claimed in claim 3, which has a softening point of 106 to 160 degree C. and a glass transition temperature of 50 to 80 degree C.

5. A developer composition for electrophotography which comprises the modified polyester produced by the process as defined in any one of claims 2 and 1 and a coloring matter.

6. A developer composition for electrophotography which comprises the modified polyester produced by the process as defined in any one of claims 2 and 1 and a coloring matter, said modified polyester having a softening point of 106 to 160 degree C. and a glass transition temperature of 50 to 80 degree C.

7. The process as claimed in claim 1, wherein the dicarboxylic acid or the anhydride thereof is selected from n-butylsuccinic acid, n butenylsuccinic acid, isobutylsuccinic acid, isobutenylsuccinic acid, n-octylsuccinic acid, n-octenylsuccinic acid, isooctylsuccinic acid, isooctenylsuccinic acid, n-dodecylsuccinic acid, n-dodecenylsuccinic acid, isododecylsuccinic acid or isododecenylsuccinic acid.

8. The process as claimed in claim 1, wherein the dicarboxylic acid or the anhydride thereof is selected from n-butenylsuccinic acid, isobutenylsuccinic acid, n-octenylsuccinic acid, isooctenylsuccinic acid, n-dodecenylsuccinic acid or isododecenylsuccinic acid.

9. The process as claimed in claim 1, wherein the dicarboxylic acid or anhydride thereof is isooctenylsuccinic anhydride.

10. The modified polyester as claimed in claim 3, wherein the dicarboxylic acid or the anhydride thereof is selected from n-butylsuccinic acid, n-butenylsuccinic acid, isobutylsuccinic acid, isobutenylsuccinic acid, n-octylsuccinic acid, n-octenylsuccinic acid, isooctylsuccinic acid, isooctenylsuccinic acid, n-dodecylsuccinic acid, n-dodecenylsuccinic acid, isododecylsuccinic acid or isododecenylsuccinic acid.

11. The modified polyester as claimed in claim 3, wherein the dicarboxylic acid or the anhydride thereof is selected from n-butenylsuccinic acid, isobutenylsuccinic acid, n-octenylsuccinic acid, isooctenylsuccinic acid, n-dodecenylsuccinic acid or isododecenylsuccinic acid.

12. The modified polyester as claimed in claim 3, wherein the dicarboxylic acid or anhydride thereof is isooctenylsuccinic anhydride.

* * * * *